US011301498B2

(12) United States Patent
Rozenszajn et al.

(10) Patent No.: US 11,301,498 B2
(45) Date of Patent: Apr. 12, 2022

(54) MULTI-CLOUD OBJECT STORE ACCESS (71) Applicant: SAP PORTALS ISRAEL LTD., Ra'anana (IL)

(72) Inventors: Sergio Rozenszajn, Nes-Tziona (IL); Liad Barel, Ramat Hasharon (IL); Anita Demayo, Tel-Aviv (IL)

(73) Assignee: SAP Portals Israel Ltd., Ra'anana (IL)

( * ) Notice: Subject to any disclaimer, the term of this patent is extended or adjusted under 35 U.S.C. 154(b) by 307 days.

(21) Appl. No.: 16/535,235

(22) Filed: Aug. 8, 2019

(65) Prior Publication Data
US 2021/0042334 A1 Feb. 11, 2021

(51) Int. Cl.
G06F 16/00 (2019.01)
G06F 16/28 (2019.01)
G06F 16/22 (2019.01)

(52) U.S. Cl.
CPC ........ G06F 16/289 (2019.01); G06F 16/2219 (2019.01); G06F 16/2272 (2019.01)

(58) Field of Classification Search
None
See application file for complete search history.

(56) References Cited

U.S. PATENT DOCUMENTS

| 5,937,409 A * | 8/1999 | Wetherbee | G06F 16/289 |
| 6,018,743 A * | 1/2000 | Xu | G06F 9/4493 |
| 6,222,533 B1 * | 4/2001 | Notani | H04L 29/06 715/733 |
| 6,766,324 B2 * | 7/2004 | Carlson | G06F 8/24 |
| 8,326,706 B2 | 12/2012 | Clemens et al. | |
| 8,417,588 B2 | 4/2013 | Ringl et al. | |
| 8,959,069 B2 * | 2/2015 | Channing | G06F 16/2438 707/703 |
| 9,426,249 B2 * | 8/2016 | Chasman | G06F 16/289 |
| 9,626,643 B2 | 4/2017 | Heitner et al. | |
| 9,836,451 B2 | 12/2017 | Halbani et al. | |
| 10,162,613 B1 | 12/2018 | Vilozny et al. | |
| 11,126,618 B1 * | 9/2021 | Padmanabhan | G06F 16/245 |
| 2004/0128644 A1 * | 7/2004 | Hurst | G06F 9/465 717/100 |

(Continued)

OTHER PUBLICATIONS

U.S. Appl. No. 11/323,665, Runde et al., filed Dec. 30, 2005.

*Primary Examiner* — Jean M Corrielus
(74) *Attorney, Agent, or Firm* — Fish & Richardson P.C.

(57) ABSTRACT

The present disclosure involves systems, software, and computer implemented methods for accessing an object store. One example method includes providing a persistency factory object configured to provide access to multiple types of persistency adapters. Each type of persistency adapter is configured to interface with a particular object store. A persistency adapter request is received from a consumer. A type of adapter to provide is determined. A determination is made that the consumer is configured to interface with a first object store and that a first persistency adapter class is associated with the first object store. A run-time reference to an instance of the first persistency adapter class is provided to the consumer. A first object store operation request to perform a first object store operation is received. The instance of the first persistency adapter class interfaces with the first object store to fulfill the first object store operation request.

19 Claims, 4 Drawing Sheets

(56) References Cited

U.S. PATENT DOCUMENTS

| | | | |
|---|---|---|---|
| 2005/0071342 A1* | 3/2005 | Calusinski | G06F 16/24573 |
| 2008/0201356 A1* | 8/2008 | Jou | G06F 16/986 |
| 2008/0201358 A1* | 8/2008 | Calusinski | G06F 16/24573 |
| 2008/0263214 A1* | 10/2008 | Austin | H04L 67/16 709/229 |
| 2010/0024031 A1 | 1/2010 | Shribman et al. | |
| 2012/0203735 A1* | 8/2012 | Channing | G06F 16/2438 707/609 |
| 2015/0039682 A1* | 2/2015 | Chasman | G06F 16/289 709/203 |
| 2018/0324132 A1* | 11/2018 | Barnard | H04L 51/24 |
| 2019/0303011 A1* | 10/2019 | Basham | G06F 3/0685 |
| 2020/0142597 A1* | 5/2020 | Basham | G06F 3/0605 |

\* cited by examiner

FIG. 4

MULTI-CLOUD OBJECT STORE ACCESS

TECHNICAL FIELD

The present disclosure relates to computer-implemented methods, software, and systems for accessing an object store.

BACKGROUND

An object database can store different types of objects. In some cases, an object database can store an object as a BLOB (Binary Large OBject). The object database can provide features for storage and management of objects. For instance, the object database can support creation, upload, download, and deletion of objects.

SUMMARY

The present disclosure involves systems, software, and computer implemented methods for accessing an object store. One example method includes: providing a persistency factory object that is configured to provide access to multiple types of persistency adapters, wherein each type of persistency adapter is configured to interface with a particular object store, and wherein the multiple types of persistency adapters include a first persistency adapter class configured to interface with a first object store; receiving a first persistency adapter request from a consumer for a persistency adapter; determining a type of persistency adapter to be provided in response to the first persistency adapter request; determining that an environment of the consumer is configured to interface with the first object store; determining that the first persistency adapter class is associated with the first object store; providing, to the consumer and in response to the first persistency adapter request, a first run-time reference to a first persistency adapter instance of the first persistency adapter class; receiving, at the first persistency adapter instance, a first object store operation request to perform a first object store operation, wherein the first object store operation request is submitted by the consumer using the provided first run-time reference; and interfacing, by the first persistency adapter instance, with the first object store to fulfill the first object store operation request.

Implementations of the can include one or more of the following features. Each type of persistency adapter can extend an abstract persistency adapter class. Consumer source code can include a source-code reference to the abstract persistency adapter class without including a source-code reference to the first persistency adapter class. The abstract persistency adapter class can declare insert, fetch, delete, delete-all, object-exists, and get-object-list methods. The first persistency adapter class can provide implementations for the declared insert, fetch, delete, delete-all, object-exists, and get-object-list methods. The implementations provided by the first persistency adapter class can interface with the first object store. A second persistency adapter request can be received from the consumer for a persistency adapter. The persistency factory can determine that the environment of the consumer has been changed to use a second object store that is different from the first object store. The persistency factor can determine that a second persistency adapter class is associated with the second object store. A second run-time reference can be provided to a second persistency adapter instance of the second persistency adapter class to the consumer in response to the second persistency adapter request. A second object store operation request to perform a second object store operation can be received, at the second persistency adapter instance. The second object store operation request can be submitted by the consumer using the provided second run-time reference. The second persistency adapter instance can interface with the second object store to fulfill the second object store operation request. The first object store operation request and the second object store operation request can each be received as a result of executing same executable code that is based on the same consumer source code. Determining that the environment of the consumer is configured to use the first object store can include retrieving object store credentials from the environment and evaluating the object store credentials.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Cloud platforms can use, at different times, different object store providers. Each object store provider can have a different API (Application Programming Interface). A developer of a service or application may want the service or application to be able to be executed in different cloud environments. However, having each developer be familiar with technical details of the different APIs can be inefficient, time consuming, and impractical. Technical details of specific APIs may become comingled with business logic. Switching object store providers can entail substantial changes to application or service code. Each API can be complex and may require deep investigation, even if the service or application ultimately only needs to use a small portion of the API. To unburden developers from having to know or understand different or various object store provider APIs, a multi-cloud object store access system can provide a simplified abstraction layer that hides details of the different object store providers.

When using the abstraction layer, specific code to access specific object store providers does not need to be included in consumer application code. Consumer applications no longer need to be concerned with particular object store interfaces. Using the abstraction layer, consumer business logic can invoke an abstract interface that stays the same regardless of which object store provider is ultimately being used. The business logic does not need to be concerned with what object store provider is being used, or what specific interface that object store provider requires. Accordingly, an interface used by the consumer can stay the same interface regardless of which type of object store is configured. Coding to a same interface can enable a different object store to be configured and used in the consumer environment without the consumer application needing to be rebuilt.

Figure 1:
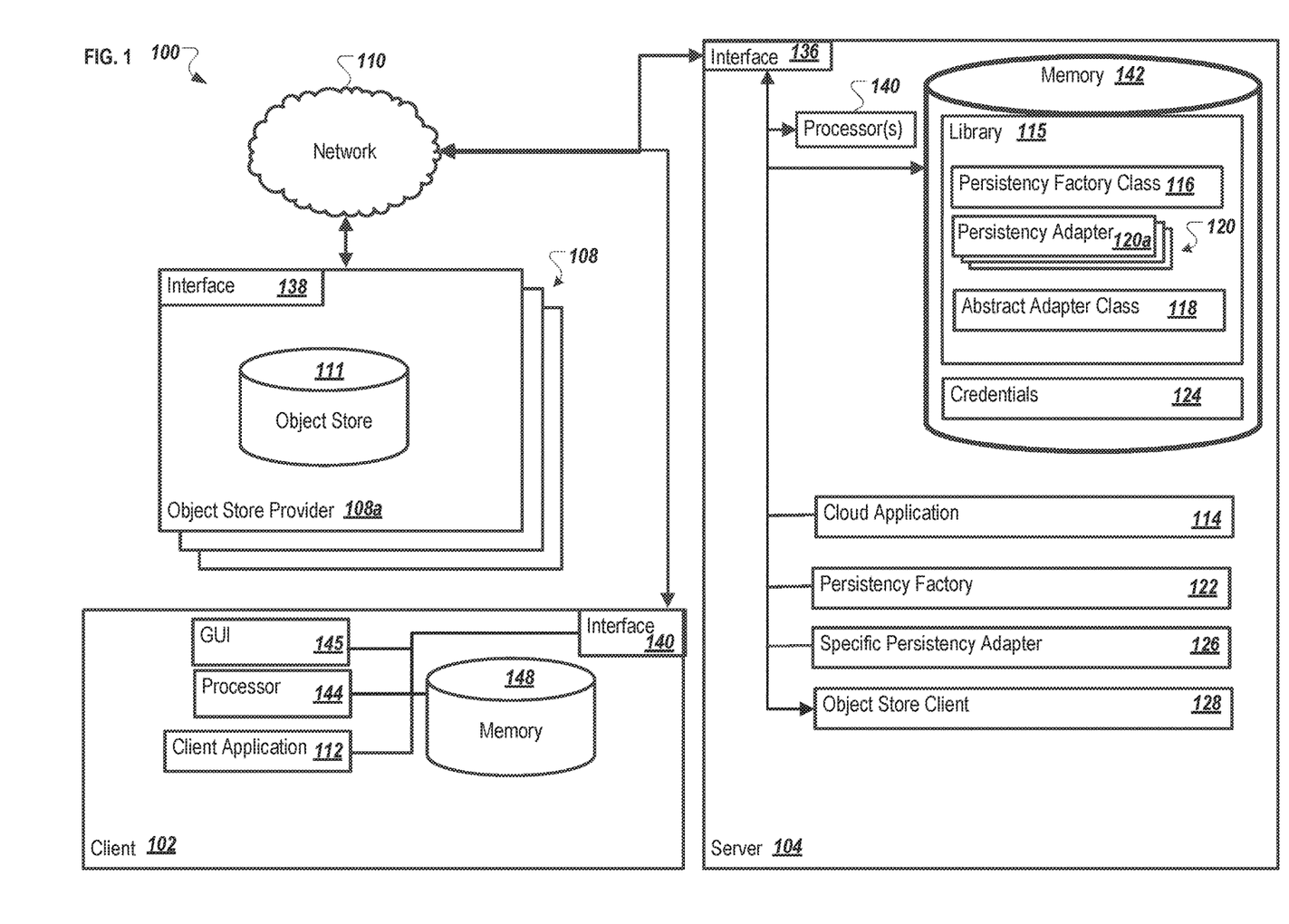
FIG. 1 is a block diagram illustrating an example system for using object store persistency adapters.

FIG. 1 is a block diagram illustrating an example system 100 for using object store persistency adapters. Specifically, the illustrated environment 100 includes or is communicably coupled with a client 102, a server 104, one or more object store providers 108 (including an object store provider 108a), and a network 110. Each object store provider 108 can provide access to a particular object store. For example, the object store provider 108a provides access to an object store 111 that can store various types of objects.

A client application 112 can access one or more cloud services provided by a cloud application 114. The cloud application 114 can store and access data using an object store. At run time, the cloud application 114 may be configured to access a particular object store provider (e.g., the object store provider 108a) from among the multiple object store providers 108. The cloud application 114 can use a library 115 that provides access to an abstraction layer. Although cloud application use of the library 115 is described, other types of applications can use the library 115. The library 115 can include code for a persistency factory class 116, an abstract adapter class 118, and a variety of persistency adapter classes 120, including a persistency adapter class 120a. In some implementations, the library is a NPM (Node Package Manager) module written in a Node.js programming language. Other programming languages/tools can be used.

The abstract adapter class 118 defines an interface that each concrete persistency adapter class 120 is to implement. Each persistency adapter class 120 can implement each of the methods defined in the abstract adapter class 118. A particular persistency adapter class 120 (e.g., the persistency adapter class 120a) provides a specific implementation for each abstract method, with each implementation configured to access a particular object store provider (e.g., the object store provider 108a). Accordingly, each persistency adapter class 120 translates an abstract call to specific instructions for a particular object store provider.

The cloud application 114 can create a persistency factory instance 122 (or access a previously-created singleton instance). The cloud application 114 can use the persistency factory instance 122 to request a persistency adapter. The cloud application 114 does not request a particular type of adapter but rather generically asks for an adapter. The persistency factory instance 122 knows how to determine and create a right type of persistency adapter based on a current configuration of the environment of the cloud application 114. The cloud application 114 does not need to know the exact type of persistency adapter that will be returned, only that the returned persistency adapter complies with the abstract interface defined by the abstract adapter class 118.

The persistency factory instance 122 can know which type of persistency adapter to create based on object store credentials 124 that have been previously injected into the environment of the cloud application 114. For example, when the cloud application 114 is configured, at configuration time, a service instance of a particular object store provider (e.g., the object store provider 108a) may have been purchased and credentials for the object store provider, such as a client identifier, client secret, URL (Uniform Resource Locator), packet, etc., may have been provided at that time. At configuration time, the provided credentials may have been pushed into the environment of the cloud application. The credentials 124 may be stored as one or more environment variables, for example.

The persistency factory instance 122 can read and evaluate the credentials 124 to determine a type of currently configured object store provider. The persistency factory instance 122 can determine if the object store provider indicated by the credentials 124 is a supported provider. If the provider is supported, the persistency factory instance 122 can create the appropriate type of persistency adapter and provide the created adapter to the cloud application.

The persistency factory instance 122 can refer to a mapping that maps object store provider types to specific persistency adapter classes 120, to determine which type of persistency adapter object to create. Once the persistency factory instance 122 identifies which type of persistency adapter to create, the persistency factory instance 122 can create a specific persistency adapter instance 126 of that type, and provide the created instance to the cloud application 114.

The persistency factory instance 122 can also provide access to an object store client 128 to the specific persistency adapter 126. The specific persistency adapter 126 can use the object store client 128 to access the object store provider 108a, for example. The cloud application 114 need not be aware of or interact with the object store client 128 directly. Other functionality can be provided for the cloud application 114. For instance, the persistency factory 122 (or the specific persistency adapter 126) can renew expired credentials.

The cloud application 114 can use the specific persistency adapter instance 126 to indirectly access the object store provider 108a, for object store operations that may be desired by the cloud application 114. At a later point in time, if a new, different object store provider is configured, the cloud application 114 can again ask for a persistency adapter, with a different type of persistency adapter (e.g., one configured to interface with the new object store provider) being returned.

As used in the present disclosure, the term "computer" is intended to encompass any suitable processing device. For example, although FIG. 1 illustrates a single server 104 and a single client 102, the system 100 can be implemented using a single, stand-alone computing device, two or more servers 104 or two or more clients 102. Indeed, the server 104 and the client 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 104 and the client 102 may be adapted to execute any operating system, including Linux, UNIX, Windows, Mac OS®, Java™, Android™, iOS or any other suitable operating system. According to one implementation, the server 104 may also include or be communicably coupled with an e-mail server, a Web server, a caching server, a streaming data server, and/or other suitable server.

Interfaces 136, 138, and 140 are used by the server 104, the object store provider 108a, and the client 102, respectively, for communicating with other systems in a distributed environment—including within the system 100—connected to the network 110. Generally, the interfaces 136, 138, and 140 each comprise logic encoded in software and/or hardware in a suitable combination and operable to communicate with the network 110. More specifically, the interfaces 136, 138, and 140 may each comprise software supporting one or more communication protocols associated with communications such that the network 110 or interface's hardware is operable to communicate physical signals within and outside of the illustrated system 100.

The server 104 includes one or more processors 140. Each processor 140 may be a central processing unit (CPU), a blade, an application specific integrated circuit (ASIC), a field-programmable gate array (FPGA), or another suitable component. Generally, each processor 140 executes instructions and manipulates data to perform the operations of the server 104. Specifically, each processor 140 executes the functionality required to receive and respond to requests from the client 102, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 104 includes memory 142. In some implementations, the server 104 includes multiple memories. The memory 142 may include any type of memory or database module and may take the form of volatile and/or non-volatile memory including, without limitation, magnetic media, optical media, random access memory (RAM), read-only memory (ROM), removable media, or any other suitable local or remote memory component. The memory 142 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 104.

The client 102 may generally be any computing device operable to connect to or communicate with the server 104 via the network 110 using a wireline or wireless connection. In general, the client 102 comprises an electronic computer device operable to receive, transmit, process, and store any appropriate data associated with the system 100 of FIG. 1. The client 102 can include one or more client applications, including the client application 112. A client application is any type of application that allows the client 102 to request and view content on the client 102. In some implementations, a client application can use parameters, metadata, and other information received at launch to access a particular set of data from the server 104. In some instances, a client application may be an agent or client-side version of the one or more enterprise applications running on an enterprise server (not shown).

The client 102 further includes one or more processors 144. Each processor 144 included in the client 102 may be a central processing unit (CPU), an application specific integrated circuit (ASIC), a field-programmable gate array (FPGA), or another suitable component. Generally, each processor 144 included in the client 102 executes instructions and manipulates data to perform the operations of the client 102. Specifically, each processor 144 included in the client 102 executes the functionality required to send requests to the server 104 and to receive and process responses from the server 104.

The client 102 is generally intended to encompass any client computing device such as a laptop/notebook computer, wireless data port, smart phone, personal data assistant (PDA), tablet computing device, one or more processors within these devices, or any other suitable processing device. For example, the client 102 may comprise a computer that includes an input device, such as a keypad, touch screen, or other device that can accept user information, and an output device that conveys information associated with the operation of the server 102, or the client 102 itself, including digital data, visual information, or a GUI 145.

The GUI 145 of the client 102 interfaces with at least a portion of the system 100 for any suitable purpose, including generating a visual representation of the overview page player 112. In particular, the GUI 145 may be used to view and navigate various Web pages. Generally, the GUI 145 provides the user with an efficient and user-friendly presentation of business data provided by or communicated within the system. The GUI 145 may comprise a plurality of customizable frames or views having interactive fields, pull-down lists, and buttons operated by the user. The GUI 145 contemplates any suitable graphical user interface, such as a combination of a generic web browser, intelligent engine, and command line interface (CLI) that processes information and efficiently presents the results to the user visually.

Memory 148 included in the client 102 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including user selections, caches, classes, frameworks, applications, backup data, business objects, jobs, web pages, web page templates, database tables, parameters, repositories storing business and/or dynamic information, and any other appropriate information including any parameters, variables, algorithms, instructions, rules, constraints, or references thereto associated with the purposes of the client 102.

There may be any number of client devices 104 associated with, or external to, the system 100. For example, while the illustrated system 100 includes one client 102, alternative implementations of the system 100 may include multiple client devices 104 communicably coupled to the server 104 and/or the network 110, or any other number suitable to the purposes of the system 100. Additionally, there may also be one or more additional client devices 104 external to the illustrated portion of system 100 that are capable of interacting with the system 100 via the network 110. Further, the term "client", "client device" and "user" may be used interchangeably as appropriate without departing from the scope of this disclosure. Moreover, while the client 102 is described in terms of being used by a single user, this disclosure contemplates that many users may use one computer, or that one user may use multiple computers.

Figure 2:
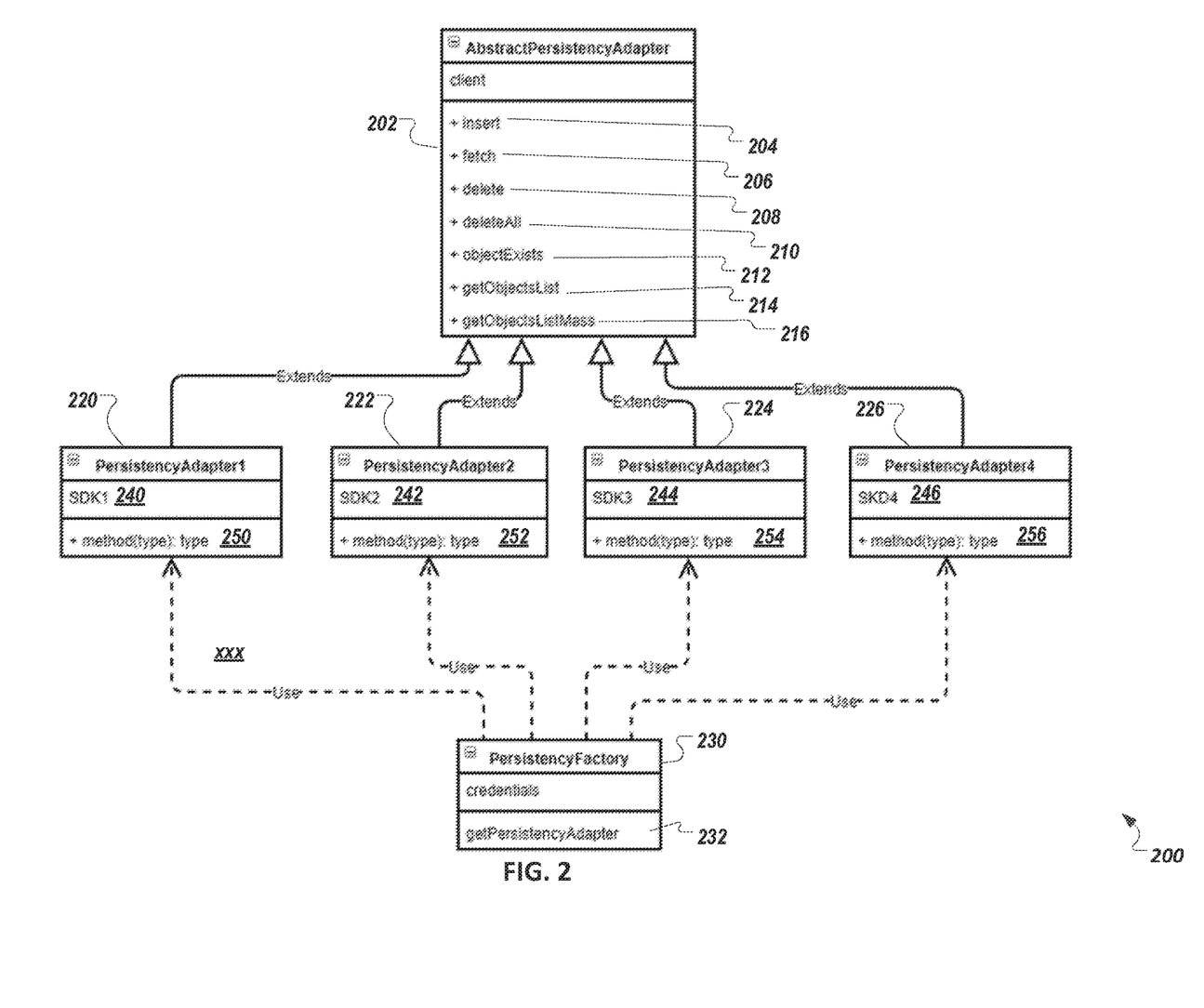
FIG. 2 is an example class diagram for a persistency adapter class model.

FIG. 2 is a class diagram for an example of a persistency adapter class model 200. An Abstract Persistency Adapter class 202 is an abstract class that defines object store methods that a concrete extension of the Abstract Persistency Adapter class 202 should support. For example, the Abstract Persistency Adapter class 202 defines insert 204, fetch 206, delete 208, deleteAll 210, objectExists 212, getObjectsList 214, and getObjectsListMass 216 methods. The insert method 204 can be used to insert an object into an object store. The fetch method 206 can be used to retrieve an object from an object store. The delete method 208 can be used to delete a specific object from an object store. The deleteAll method 210 can be used to delete all objects from an object store. The objectExists method 212 can be used to query whether a particular object exists in an object store. The getObjectsList method 214 or the getObjectsListMass method 216 can be used to retrieve a list of objects in an object store.

The Abstract Persistency Adapter lass class 202 can be implemented by various extension classes, such as a first Persistency Adapter class 220, a second Persistency Adapter class 222, a third Persistency Adapter class 224, and a fourth Persistency Adapter class 226. Each concrete persistency adapter class can provide specific implementations for the insert 204, fetch 206, delete 208, deleteAll 210, objectExists 212, getObjectsList 214, and getObjectsListMass 216 methods, with each implemented method providing functionality that interfaces with a particular object store with which the respective concrete persistency adapter class is configured to interface.

A Persistency Factory class 230 can be used by a consumer to get a reference to a particular concrete persistency adapter object that is associated with the consumer's environment. The consumer can call a getPersistencyAdapter method 232 and receive an instance of the type of persistency adapter that is configured for the consumer's environment. The consumer doesn't need to be aware exactly which type of persistency adapter object is being returned—whichever type of object is returned will comply with the interface defined in the Abstract Persistency Adapter class 202, and the consumer can call any of the insert 204, fetch 206, delete 208, deleteAll 210, objectExists 212, getObjectsList 214, or getObjectsListMass 216 methods, and the particular persistency adapter object that had been returned to the consumer can execute its method(s) that are configured for the particular type of object store being used in the consumer's environment.

Each of the first Persistency Adapter class 220, the second Persistency Adapter class 222, the third Persistency Adapter class 224, and the fourth Persistency Adapter class 226 includes a SDK (Software Development Kit, e.g., API) reference 240, 242, 244, or 246, respectively. Each SDK reference 240, 242, 244, or 246 can enable a respective adapter to access a respective interface of a respective object store provider that is associated with the respective adapter. Each of the first Persistency Adapter class 220, the second Persistency Adapter class 222, the third Persistency Adapter class 224, and the fourth Persistency Adapter class 226 includes a type method 250, 252, 254, or 256, respectively, which can be used to query a type of object store provider that is associated with the respective adapter.

Figure 3:
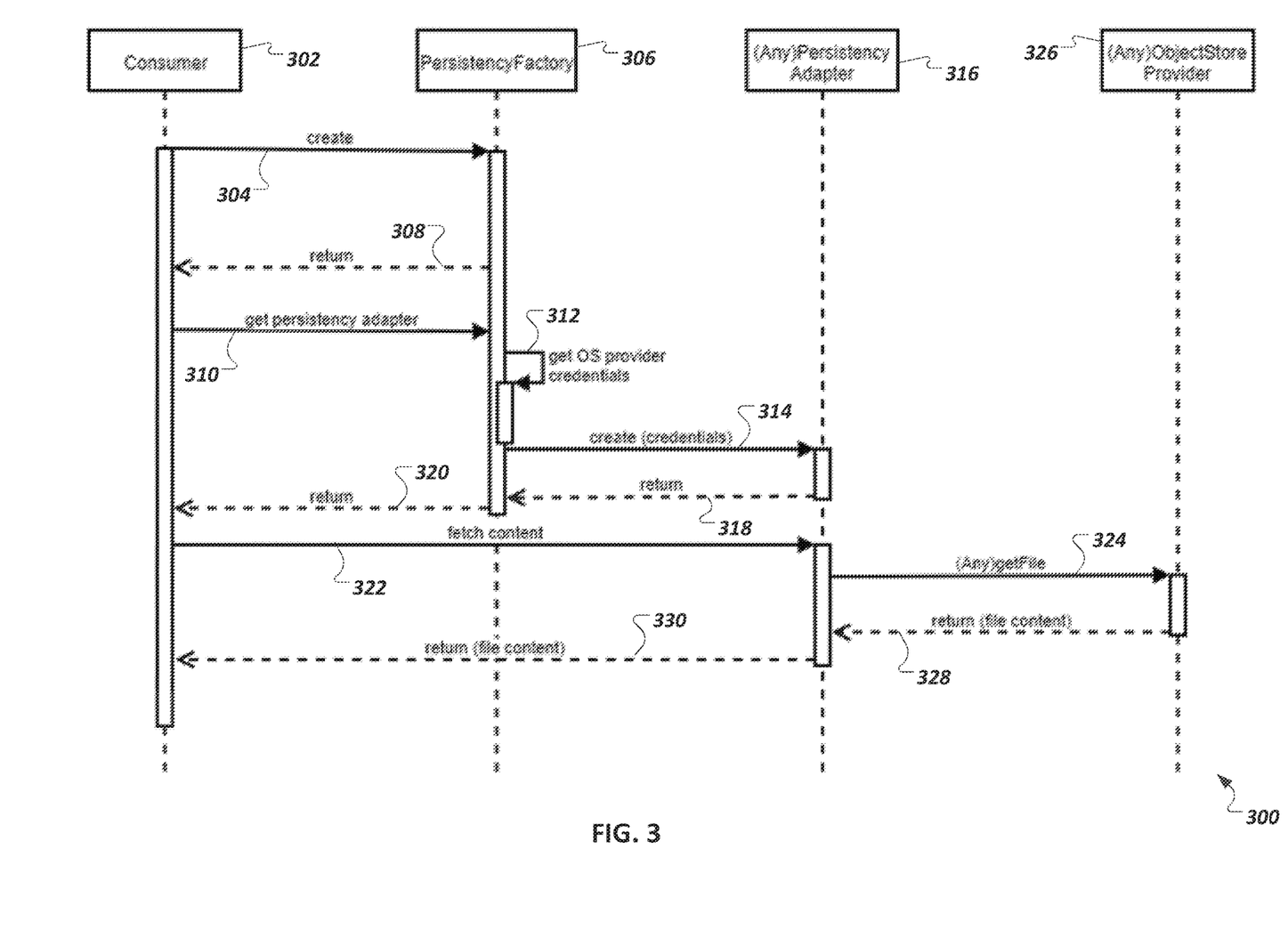
FIG. 3 is a swim lane diagram of an example method for using object store persistency adapters.

FIG. 3 is a swim lane diagram for of an example method 300 for using object store persistency adapters. A consumer 302 sends a create request 304 to a persistency factory object 306 to get a reference to the persistency factory object 306. The consumer 302 can be a cloud application, for example. The persistency factory object 306 returns the requested reference 308. The consumer 302 uses the received reference to make a get-persistency-adapter call 310 to the persistency factory object 306.

The persistency factory object 306 determines operating system provider credentials (at 312). The persistency factory object 306 can determine a type of object store provider that has been configured for the consumer's environment by evaluating the retrieved credentials. The persistency factory object 306 creates an instance of the type of persistency adapter object 316 corresponding to the type of object store provider that has been configured for the consumer's environment, passing along the determined credentials on the create call. The persistency factory object 306 obtains a reference, at 318, to the created instance of the persistency adapter object 306. The persistency factory object 306 forwards a reference 320 to the instance of the persistency adapter object 316 to the consumer 302.

The consumer 302 uses the received reference to make a fetch call 322 to the persistency adapter object 316. The persistency adapter object 316 is configured to translate a generic fetch request to a particular type of call for the particular type of object store associated with the persistency adapter 306. For example, the persistency adapter 316 makes a getFile call 324 to an object store provider 326 that is associated with the persistency adapter object 316. The object store provider 326 returns requested file content 328 to the persistency adapter object 316. The persistency adapter object 316 forwards requested file content 330 to the consumer 302. The consumer 302 can make other types of calls to the persistency adapter 316, with corresponding calls being made to the object store provider 326, by the persistency adapter object 316, on behalf of the consumer 302.

Figure 4:
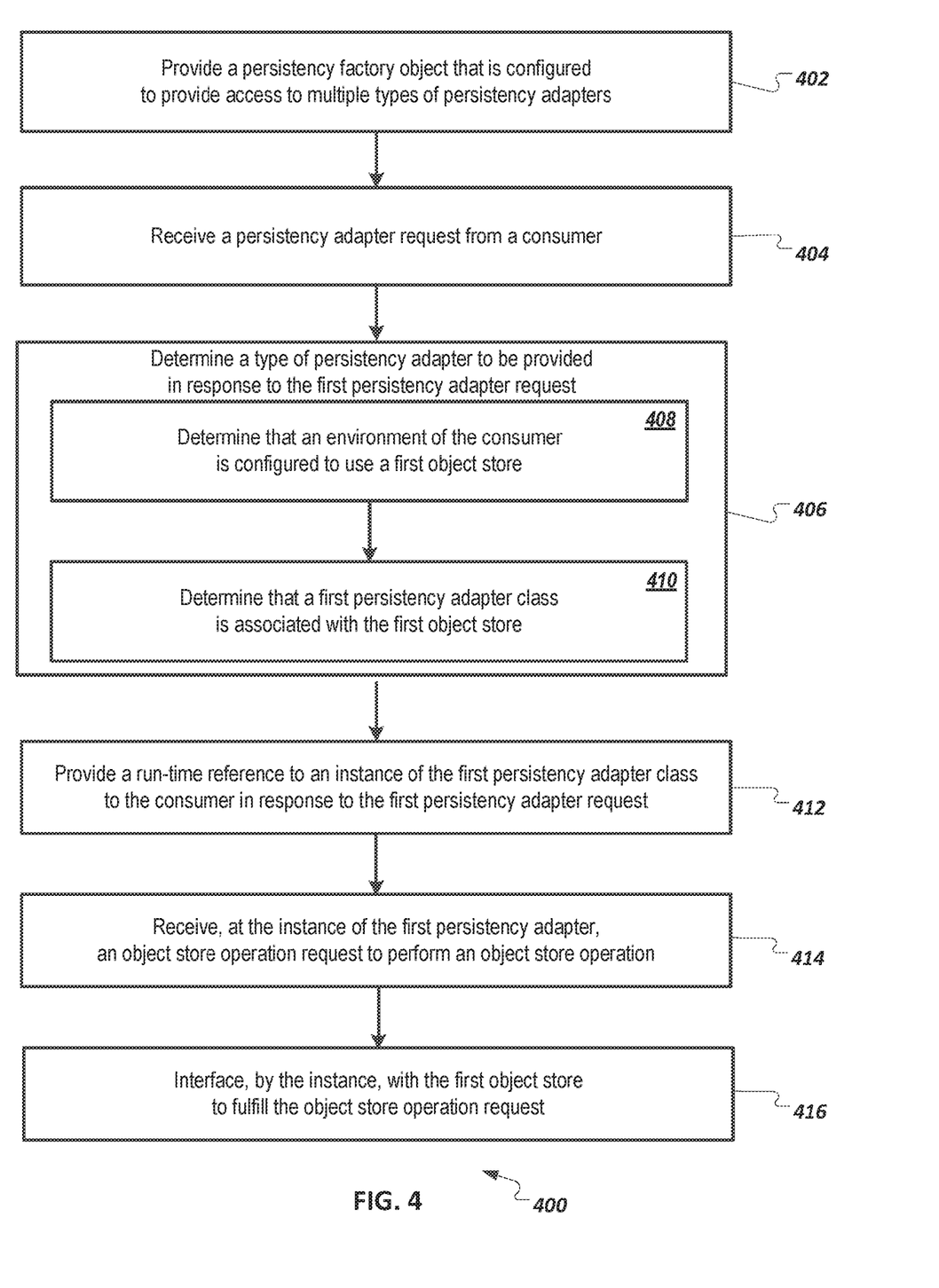
FIG. 4 is a flowchart of an example method for using object store persistency adapters.

FIG. 4 is a flowchart of an example method 400 for using object store persistency adapters. For clarity of presentation, the description that follows generally describes method 400 and related methods in the context of FIG. 1. However, it will be understood that method 400 and related methods may be performed, for example, by any other suitable system, environment, software, and hardware, or a combination of systems, environments, software, and hardware, as appropriate.

At 402, a persistency factory object is provided that is configured to provide access to multiple types of persistency adapters. The persistency factory object can be a singleton object (e.g., where a single instance exists in the system). Each type of persistency adapter is configured to interface with a particular type of object store. The multiple types of persistency adapters include, among other persistency adapters, a first persistency adapter class configured to interface with a first object store. Other types of persistency adapters (e.g., other persistency adapter classes) can be configured to interface with other, different types of object stores. Each type of persistency adapter can be represented by a concrete persistency adapter class that extends an Abstract Persistency Adapter abstract base class. The Abstract Persistency Adapter base class can declare insert, fetch, delete, delete-all, object-exists, and get-object-list methods (among other methods). The first persistency adapter class (and other concrete persistency adapter classes) can provide implementations for the declared insert, fetch, delete, delete-all, object-exists, and get-object-list methods. The implementations provided by the first persistency adapter class can interface with the first object store.

At 404, a persistency adapter request for a persistency adapter is received from a consumer. The first persistency adapter request can be received as a result of the consumer calling a getPersistencyAdapter method of the persistency factory object. The consumer can be a cloud application or another type of application.

At 406, the persistency factory object determines a type of persistency adapter to be provided in response to the first persistency adapter request.

At 408, determining the type of persistency adapter includes determining that an environment of the consumer is configured to use the first object store. Each consumer can be configured, at a given point in time, to use a particular object store, from among multiple object stores. The persistency factory object can retrieve object store credentials, from the consumer's environment, and evaluate the credentials to determine that the environment is configured to use the first object store.

At 410, determining the type of persistency adapter includes determining that the first persistency adapter class is configured to interface with the first object store. The persistency factory object can maintain a mapping of object store types to persistency adapter classes, for example.

At 412, a run-time reference to a first persistency adapter instance of the first persistency adapter class is provided to the consumer in response to the persistency adapter request. The persistency factory object can create an instance of the first persistency adapter class, in response to the persistency adapter request, and return a reference to the created instance, or can identify and return a reference to a previously-created instance of the first persistency adapter class.

At 414, a first object store operation request is received, at the first persistency adapter instance, to perform a first object store operation. The first object store operation request is submitted by the consumer using the provided first run-time reference. Consumer source code for the first object store operation request can include a source-code reference to the abstract persistency adapter class without including a source-code reference to the first persistency adapter class.

At 416, the first persistency adapter instance interfaces with the first object store to fulfill the first object store operation request.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method comprising:
    providing a reference to a persistency factory object to a consumer, wherein the persistency factory object is configured to provide access to multiple types of persistency adapters, wherein each type of persistency adapter is configured to interface with a particular object store, and wherein the multiple types of persistency adapters include a first persistency adapter class configured to interface with a first object store;
    receiving, at the persistency factory object, a first persistency adapter request from the consumer for a persistency adapter;
    determining a type of persistency adapter to be provided in response to the first persistency adapter request, including:
        determining that an environment of the consumer is configured to interface with the first object store; and
        determining that the first persistency adapter class is associated with the first object store;
    providing, by the persistency factor object, to the consumer and in response to the first persistency adapter request, a first run-time reference to a first persistency adapter instance of the first persistency adapter class;
    receiving, at the first persistency adapter instance, a first object store operation request to perform a first object store operation, wherein the first object store operation request is submitted by the consumer using the provided first run-time reference;
    interfacing, by the first persistency adapter instance, with the first object store to fulfill the first object store operation request;
    receiving, at the persistency factory object, a second persistency adapter request from the consumer for a persistency adapter;
    determining that the environment of the consumer has been changed to use a second object store that is different from the first object store;
    determining that a second persistency adapter class is associated with the second object store; and
    providing, by the persistency factory object, a second run-time reference to a second persistency adapter instance of the second persistency adapter class to the consumer in response to the second persistency adapter request.

2. The computer-implemented method of claim 1, wherein each type of persistency adapter extends an abstract persistency adapter class.

3. The computer-implemented method of claim 2, wherein source code of the consumer includes a source-code reference to the abstract persistency adapter class and does not include a source-code reference to the first persistency adapter class.

4. The computer-implemented method of claim 2, wherein the abstract persistency adapter class declares insert, fetch, delete, delete-all, object-exists, and get-object-list methods.

5. The computer-implemented method of claim 4, wherein the first persistency adapter class provides implementations for the insert, fetch, delete, delete-all, object-exists, and get-object-list methods.

6. The computer-implemented method of claim 5, wherein the implementations provided by the first persistency adapter class interface with the first object store.

7. The computer-implemented method of claim 1, further comprising:
    receiving, at the second persistency adapter instance, a second object store operation request to perform a second object store operation, wherein the second object store operation request is submitted by the consumer using the provided second run-time reference; and interfacing, by the second persistency adapter instance, with the second object store to fulfill the second object store operation request.

8. The computer-implemented method of claim 7, wherein the first object store operation request and the second object store operation request are each received as a result of executing same executable code that is based on the same consumer source code.

9. The computer-implemented method of claim 1, wherein determining that an environment of the consumer is configured to use the first object store comprises retrieving object store credentials from the environment and evaluating the object store credentials.

10. A system comprising:
one or more computers associated with an enterprise portal; and
a computer-readable medium coupled to the one or more computers having instructions stored thereon which, when executed by the one or more computers, cause the one or more computers to perform operations comprising:
providing a reference to a persistency factory object to a consumer, wherein the persistency factory object is configured to provide access to multiple types of persistency adapters, wherein each type of persistency adapter is configured to interface with a particular object store, and wherein the multiple types of persistency adapters include a first persistency adapter class configured to interface with a first object store;
receiving, at the persistency factory object, a first persistency adapter request from the consumer for a persistency adapter;
determining a type of persistency adapter to be provided in response to the first persistency adapter request, including:
determining that an environment of the consumer is configured to interface with the first object store; and
determining that the first persistency adapter class is associated with the first object store;
providing, by the persistency factor object, to the consumer and in response to the first persistency adapter request, a first run-time reference to a first persistency adapter instance of the first persistency adapter class;
receiving, at the first persistency adapter instance, a first object store operation request to perform a first object store operation, wherein the first object store operation request is submitted by the consumer using the provided first run-time reference;
interfacing, by the first persistency adapter instance, with the first object store to fulfill the first object store operation request;
receiving, at the persistency factory object, a second persistency adapter request from the consumer for a persistency adapter;
determining that the environment of the consumer has been changed to use a second object store that is different from the first object store;
determining that a second persistency adapter class is associated with the second object store; and
providing, by the persistency factory object, a second run-time reference to a second persistency adapter instance of the second persistency adapter class to the consumer in response to the second persistency adapter request.

11. The system of claim 10, wherein each type of persistency adapter extends an abstract persistency adapter class.

12. The system of claim 11, wherein source code of the consumer includes a source-code reference to the abstract persistency adapter class and does not include a source-code reference to the first persistency adapter class.

13. The system of claim 11, wherein the abstract persistency adapter class declares insert, fetch, delete, delete-all, object-exists, and get-object-list methods.

14. The system of claim 13, wherein the first persistency adapter class provides implementations for the declared insert, fetch, delete, delete-all, object-exists, and get-object-list methods.

15. A computer program product encoded on a non-transitory storage medium, the product comprising non-transitory, computer readable instructions for causing one or more processors to perform operations comprising:
providing a reference to a persistency factory object to a consumer, wherein the persistency factory object is configured to provide access to multiple types of persistency adapters, wherein each type of persistency adapter is configured to interface with a particular object store, and wherein the multiple types of persistency adapters include a first persistency adapter class configured to interface with a first object store;
receiving, at the persistency factory object, a first persistency adapter request from the consumer for a persistency adapter;
determining a type of persistency adapter to be provided in response to the first persistency adapter request, including:
determining that an environment of the consumer is configured to interface with the first object store; and
determining that the first persistency adapter class is associated with the first object store;
providing, by the persistency factor object, to the consumer and in response to the first persistency adapter request, a first run-time reference to a first persistency adapter instance of the first persistency adapter class;
receiving, at the first persistency adapter instance, a first object store operation request to perform a first object store operation, wherein the first object store operation request is submitted by the consumer using the provided first run-time reference;
interfacing, by the first persistency adapter instance, with the first object store to fulfill the first object store operation request;
receiving, at the persistency factory object, a second persistency adapter request from the consumer for a persistency adapter;
determining that the environment of the consumer has been changed to use a second object store that is different from the first object store;
determining that a second persistency adapter class is associated with the second object store; and
providing, by the persistency factory object, a second run-time reference to a second persistency adapter instance of the second persistency adapter class to the consumer in response to the second persistency adapter request.

16. The computer program product of claim 15, wherein each type of persistency adapter extends an abstract persistency adapter class.

17. The computer program product of claim 16, wherein consumer source code includes a source-code reference to the abstract persistency adapter class and does not include a source-code reference to the first persistency adapter class.

18. The computer program product of claim 16, wherein the abstract persistency adapter class declares insert, fetch, delete, delete-all, object-exists, and get-object-list methods.

19. The computer program product of claim 18, wherein the first persistency adapter class provides implementations for the declared insert, fetch, delete, delete-all, object-exists, and get-object-list methods.

* * * * *